United States Patent [19]

Felix

[11] 4,097,692
[45] Jun. 27, 1978

[54] METHOD AND APPARATUS FOR THE TWO-WAY TRANSMISSION OF PULSES

[75] Inventor: Ernst Felix, Uster, Switzerland

[73] Assignee: Zellweger, Ltd., Switzerland

[21] Appl. No.: 717,681

[22] Filed: Aug. 25, 1976

[30] Foreign Application Priority Data

Sep. 25, 1975 Switzerland ............... 12474/75

[51] Int. Cl.² ............... H04M 11/00; H04H 1/14; H04L 5/00
[52] U.S. Cl. .................. 179/2.5 R; 178/50; 340/310 R
[58] Field of Search .......... 340/310 R; 178/50, 58 R, 178/58 A, 53.1 R; 179/15 AL, 2.5 R

[56] References Cited

U.S. PATENT DOCUMENTS

| | | | |
|---|---|---|---|
| 3,458,657 | 7/1969 | Lester et al. ............... | 179/2.5 R |
| 3,720,790 | 3/1973 | Watson et al. ............... | 179/15 AL |
| 3,806,876 | 4/1974 | Kniel et al. ............... | 340/310 R |
| 4,007,458 | 2/1977 | Hollabaugh ............... | 340/310 R |

*Primary Examiner*—Thomas A. Robinson
*Attorney, Agent, or Firm*—Craig & Antonelli

[57] ABSTRACT

In a method and apparatus for the two-way transmission of pulses between a plurality of out-stations generally connected to a common power supply network and at least one control unit, the data is applied to the power supply network using pulse code modulation so that the power supply network serves as a data bus bar between the out-stations and the control unit. A multiplexing of the data applied to the network permits individual communication between an out-station and the control unit during an assigned time slot with the power supply frequency being used for synchronizing the timing of the multiplex system.

23 Claims, 6 Drawing Figures

METHOD AND APPARATUS FOR THE TWO-WAY TRANSMISSION OF PULSES

The invention relates to a method of and an apparatus for the two-way transmission of pulses.

The collection of data from points which are distributed over a wide area is a matter of considerable importance in the control of certain systems. For example, in the textile industry production and further processing is carried out at very many manufacturing points. In this regard, there are weaving mills with over a thousand weaving machines and spinning mills with over one hundred thousand spindles. These machines are frequently spread over several rooms, floors or even throughout several buildings. With such a multiplicity of individual production points, there would appear to be a good basis for monitoring them by means of computers.

Until now, however, suitable computer systems have not been readily used. The main reason for this is to be found in the high cost incurred in collecting data from such a multiplicity of widely distributed data collection points. The costs occur not only as a result of the numerous measurement value sensors required, but even more as a result of the extensive data transmission systems needed to transmit the data from each collection point to the central computer.

In general, from each individual production point (hereinafter termed an "out-station") a connection must be made to a control unit which collects and processes the data. Certain simplifications can be achieved with the use of multiplexers, but even then a connection line is necessary from each out-station to the multiplexer. In addition, it is often required to incorporate such systems into existing enterprises. For this purpose cables and wires must be laid in existing structures, causing substantial additional expense and often taking up otherwise needed space.

It is often also necessary to transmit information from the control unit to the out-stations, i.e., two-way transmission must be possible. Under certain circumstances for this purpose also, further expensive cabling is necessary.

According to the present invention, there is provided a method for the two-way transmission of pulses between a plurality of out-stations generally connected to a power supply network and at least one control unit, wherein the control unit and all the out-stations are connected to one another directly at their feed from the power supply network by a high frequency transmission selectively applied to the power supply network, and the power supply network is thereby used as a data bus bar system.

The invention also provides an apparatus for the two-way transmission of pulses between a plurality of out-stations generally connected to a power supply network and at least one control unit also connected to the said network, comprising means for high frequency modulation of pulses to be transmitted, means for coupling this modulated high frequency to the power supply network, means for coupling out these modulated high frequency signals from the power supply network, and means for the corresponding reconversion of the high frequency signals into pulses.

The invention provides for communication between geographically relatively distant out-stations and control units using the same power supply network. In order that the data transmission pulses and the mains voltage can be separated from one another, the data transmission pulses are converted into pulses modulated with a high frequency. This high frequency is advantageously in the range of 50 to 200 KHz, though it can also be above or below that range. The specified range is, however, particularly suitable for high frequency transmission on the power supply network of industrial concerns. Such a frequency range provides a sufficiently large difference from the mains frequency to maintain proper frequency separation, but at the same time the line impedances are not excessively high for the transmission of such frequencies.

The high frequency could be fed in between any two phases of a three-phase mains supply voltage. However, it is much better to feed in the frequencies between one phase conductor and the neutral conductor, the protective ground or quite generally, a ground appropriate to a signal of high frequency. A concrete floor of a building may be suitable for the latter purpose. This has the advantage that phase shifting capacitors, which in the case of motors are often connected between the phases, do not short circuit the high frequency. These phase shifting capacitors do distribute the high frequency potential from all phases approximately uniformly. This effect may in some cases be desirable so that the coupling in and out of the high frequency can be effected at any phase of the three-phase mains supply voltage, i.e., the coupling-in can take place between a certain phase and neutral, while the coupling-out can be effected between any phase and neutral.

Three phase power supply systems use a high voltage transformer. Coupling-in the high frequency between any phase and neutral so that the high frequency lies on all three phases, has the further advantage that the high voltage transformer constitutes a fixed barrier to signals. As a rule, the secondary side of such a high voltage transformer is constructed in a star-connected three-phase system, so that there can be no transmission of voltages between the three phases and the star point. Thus, no pulses pass into the high voltage network so that no interference can occur in any other data collection systems which might be present as a distant connection to the same power source. Also, no pulses can pass via the high voltage supply through the high voltage transformer into the low voltage network. Thus, there is a fixed range for the data collection system, namely the entire secondary side of the high voltage transformer. For data collection from machines and apparatus in whole factories this is particularly advantageous, since many of these factories have their own high voltage transformer and in this way the data collection range is automatically restricted to the factory concerned.

Obviously, in factories having several high voltage transformers, several data collection systems can be formed simultaneously, and these can use a single control unit.

Much use is made in computer systems of the so-called bus bar system, by which pulses can be delivered to the bus bar system from data collection points or can be accepted from it. This bus bar system is also connected to a computer unit which accepts pulses from the bus bar system or delivers pulses to the bus bar system. These bus bar systems generally extend, however, only over one whole device or several devices inside a computer room.

In a data collection system having a bus bar system as described above, clock pulses are generally required. Since, according to the invention, the data collection points and the control units are already connected to the power supply network for reasons of supplying power to the system, it is particularly advantageous to use the mains frequency as the clock frequency. This eliminates the need to deliver special clock pulses to the bus bar system.

It is particularly advantageous to select as the clock frequency a multiple of the mains frequency, in particular, a multiple containing 3 as a factor, so that in three-phase networks all the phase conductors are equally usable for the synchronization, it being then unimportant which phase conductor is used for the synchronization.

A bus bar system generally consists of a plurality of wiring systems. For example, all information from the out-stations is supplied to a first wiring system and accepted by the control unit. On a second wiring system the addresses are transmitted from the control unit to the out-stations. A third wiring system transmits the clock pulses, etc. This separation is advantageous to avoid confusion between information pulses, addressing pulses and clock pulses.

However, in accordance with the present invention only one wiring system is present, namely, the power supply network. Nevertheless, to permit transmissions on different channels, different frequencies can be used. For example, a frequency of 100 KHz could be chosen for information transmission and a frequency of 130 KHz for addressing. However, as is described below, it is advantageous to use a time-multiplexing method.

The method and apparatus according to the invention are not restricted exclusively for use in the textile industry, which was described above as a preferred field of application. They can also be used in other sectors and branches of industry in which data must be monitored at a number of measurement points and information must be transmitted from widely spaced collection stations and in which these collection points are already connected to the wiring system used for power supply.

It is an object of the present invention to provide a data bus bar system for transmission of data from a plurality of out-stations to a central control unit which is extremely simple and inexpensive as compared to similar systems of the prior art.

It is another object of the present invention to provide a method and apparatus for effecting two-way transmission of pulses between a plurality of out-stations generally connected to a common power supply network and at least one control unit without the need for special data transmission lines or lines for carrying special timing pulses.

These and other objects, features and advantages of the present invention will become more apparent from the following detailed description when taken in conjunction with the accompanying drawings, wherein.

Figure 1:
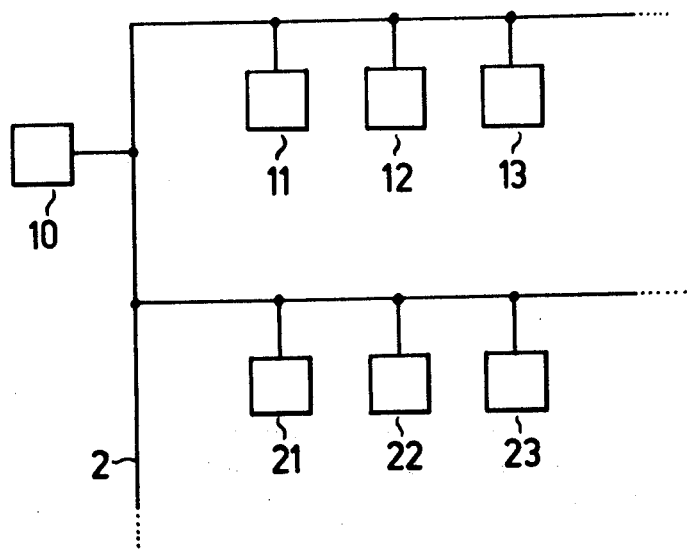
FIG. 1 is a schematic circuit diagram of a network of out-stations to which the present invention may be applied.

FIG. 1 shows a network 2 used for the power supply, to which a number of machines or apparatus, hereinafter termed out-stations, 11, 12, 13 . . . and 21, 22, 23 . . . , are connected. In addition, a control unit 10 is connected to the power supply network 2.

In standard data transmission technology, synchronizing clock pulses are used to control the timing of data transmission; for example, in the so-called time division multiplex method time slot generators are employed to control the multiplexing of data. These clock pulses must be distributed via a clock pulse wiring system. In accordance with the present invention, the synchronization is effected via the power supply network 2, which is primarily used for the power supply, so that a special wiring system for clock pulses is not necessary.

Figure 2:
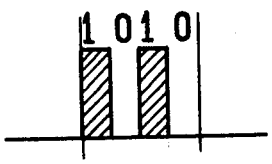
FIG. 2 is a pulse diagram of an exemplary start pulse.

The time cycle of a data transmission is as follows. The control unit 10 emits a start pulse to the power supply network 2 at the beginning of the time frame. To prevent interference voltages in the system simulating a start pulse, it is advantageous to encode the start pulse. FIG. 2 shows such an example of such an encoded start pulse. The pulse has four bit positions which are occupied either with positive pulses "1" or with pulse gaps "0". This start pulse is transmitted via the power supply network 2 to each of the out-stations 11 . . . 21 . . . . simultaneously. In these out-stations, counting devices of known type, for example, ring counters or shift registers, are provided, which as a result of the start pulse, begin to count from an initial value and do so at the mains frequency or a multiple thereof, as will be described in greater detail hereinafter.

Figure 3:
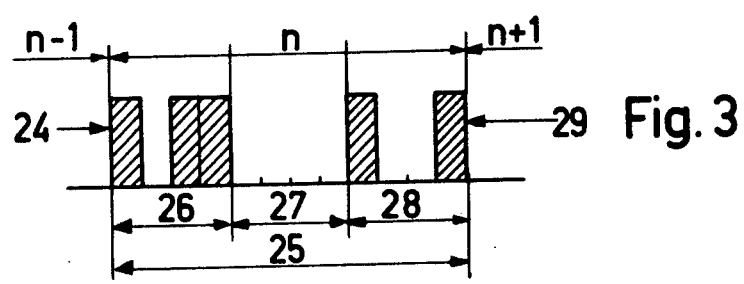
FIG. 3 is a pulse diagram of a sample of information emitted by an out-station.

Immediately after the start pulse has been emitted, the first out-station transmits its information to the power supply network. This information consists advantageously not of a single pulse, but of a pulse group, since from each of the out-stations more than one bit of information is generally required (FIG. 3). Thus, all of the information to be transmitted can be transmitted at the mains frequency or a predetermined multiple thereof. As soon as the first out-station has transmitted its information, i.e., at the end of the first time slot or interval, information transmission from the second out-station can begin. The counting device of the second out-station must be encoded accordingly. Thus, the out-stations are sequentially connected one by one, on the basis of their encoding, to the control unit 10 for information transmission during successive time slots of the repetitive time frame. In encoding the counting devices of the out-stations care should be taken that no two out-stations are encoded with the same time slot or interval because their information would then be delivered simultaneously to the power supply network 2 or received from it resulting in a confusion of data.

If no further information is to be transmitted during a particular time slot or interval, for example, that time slot during which the out-station 21 is connected to the power supply network, a command pulse (or a command pulse group) can be sent from the control unit 10 to the network 2. This command pulse then only reaches the out-station 21 because the other counting devices are encoded for other time intervals. Thus, information can be transmitted in both directions, i.e., from the control unit to the out-stations and vice versa.

FIG. 3 shows by way of example a pulse group 25 for the nth out-station. In this arrangement, in the time slot or interval 26 occupied by the first four pulse positions or bits, information is applied by the out-station to the power supply network 2. The pulse positions in the interval 27 are unoccupied and available to receive an optional command from the control unit 10 via the network 2. The following pulse positions of the interval 28 are used for information transmission from the out-station n to the power supply network, for example, in reply to information received during period 27. The reference numeral 24 denotes the time interval for the preceding out-station n-1 and the reference numeral 29 indicates the time interval for the subsequent out-station n + 1.

The time required for the transmission of all information in a fairly large enterprise could under certain circumstances be very long. It is therefore of particular advantage not to work with the base frequency of the mains frequency but with a multiple thereof. In this arrangement it is moreover particularly advantageous if this multiple has the number 3 as a factor, so that in three phase systems it is not necessary to specify which conductor should actually be used for the synchronization of the mains frequency. When operating at a frequency which is three times the mains frequency or an integral multiple thereof, it is therefore unimportant which conductor is selected for synchronization.

Figure 4:
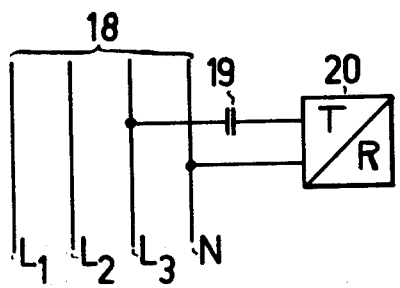
FIG. 4 is a schematic diagram of a three-phase network with a transmitter-receiver connected thereto.

FIG. 4 shows schematically a power supply network 18 with the three-phase conductors $L_1$, $L_2$, $L_3$ and a neutral conductor N. A transmitter-receiver 20, which may form part of the control unit 10, is connected via a capacitor 19 to the conductor $L_3$ and to the neutral conductor N. The transmitter-receiver is designed in a known manner so that as a transmitter it emits information to the wiring system in the form of encoded pulses and as a receiver it detects encoded pulses and converts them into corresponding switching commands.

The control unit 10 is so constructed that in addition to generating and transmitting start pulses it is capable of converting information transmitted from the out-stations into corresponding data, storing the data and optionally printing out the data, and is capable of converting instructions to be sent to the out-stations into corresponding encoded pulses and supplying the pulses to the power supply network 2.

Of course, other methods of coupling the transmitter-receiver 20 to the wiring system 18 can be selected; for example, an inductive series feed may be used, the feed being advantageously undertaken between a real or simulated star point of the three-conductor network and the neutral conductor, or the protective ground or signal ground sufficient for high frequency.

Figure 5:
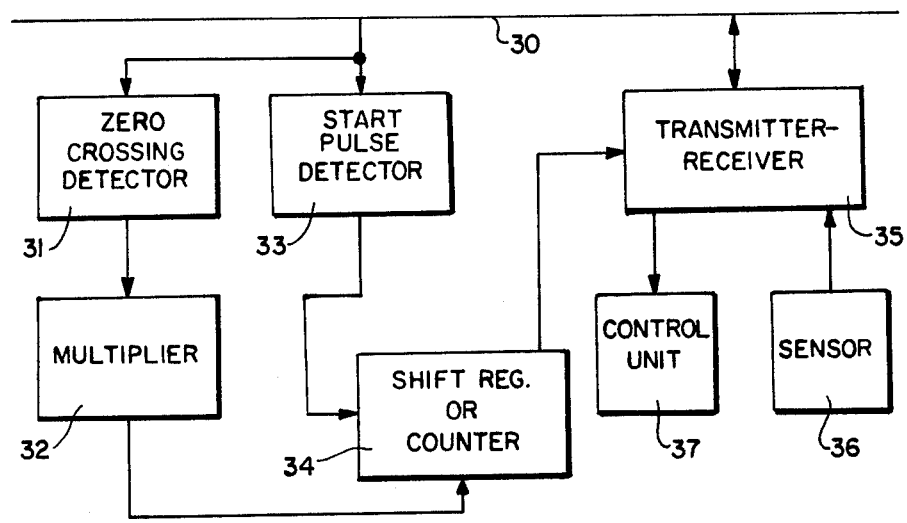
FIG. 5 is a schematic block diagram of an example of an out-station which may be used in accordance with this invention.

Referring to FIG. 5, which illustrates one example of an out-station in accordance with the present invention, the line 30 forms part of the power supply network 2, which carries coded transmission signals received from the control unit 10 in addition to the power supply voltage at the standard supply frequency. For synchronizing the out-station to the power supply frequency, a zero crossing detector 31 is connected to the line 30 to produce output pulses timed to the frequency of the power supply voltage carried by the line. The output of the detector 31 is then connected to a multiplier 32 which produces clock pulses that are a multiple of the base frequency of the mains supply, as already discussed.

A start pulse detector 33 is also connected to the line 30 to detect receipt of a start pulse applied to the line from the control unit 10. The detector 33 applies an output pulse to a shift register 34 each time a start pulse is detected, and this output pulse is shifted through the successive stages of the shift register 34 by the clock pulses received from the multiplier 32. The control unit 10 generates a start pulse at the beginning of each time frame, which includes a pulse group time slot for each out-station. In the shift register 34, a selected stage corresponding to the pulse group time slot assigned to that particular out-station is monitored, so that as the start pulse which is shifted through the successive stages of the shift register reaches the particular selected stage, the output from this stage can be used to enable the transmitter-receiver 35 at appropriate times for their operation.

The transmitter-receiver 35 is connected to a sensor 36 or other device which generates the data to be gathered by the control unit 10 as well as a control unit 37 which effects the command functions requested from the control unit 10.

As indicated in connection with FIG. 3, each pulse group time slot may be made up of twelve bits, with the interval 26 providing four bits for transmission of data between a designated out-station and the control unit, the interval 27 being available for transmission of four bits of information between the control unit and the designated out-station, and the interval 28 providing four bit times for transmission of further data from the designated out-station to the control unit 10. The selective control over the transmitter-receiver 35 in each out-station to effect the respective transmission and receipt of data during the intervals 26, 27, and 28 of each pulse group time slot can be effected in several ways. For example, the shift register 34 may be made up of a number of stages equal to twelve times the number of out-stations so that a selected group of twelve consecutive stages in the shift counter 34 may be assigned to control the transmitter-receiver 35 in each out-station.

Figure 6:
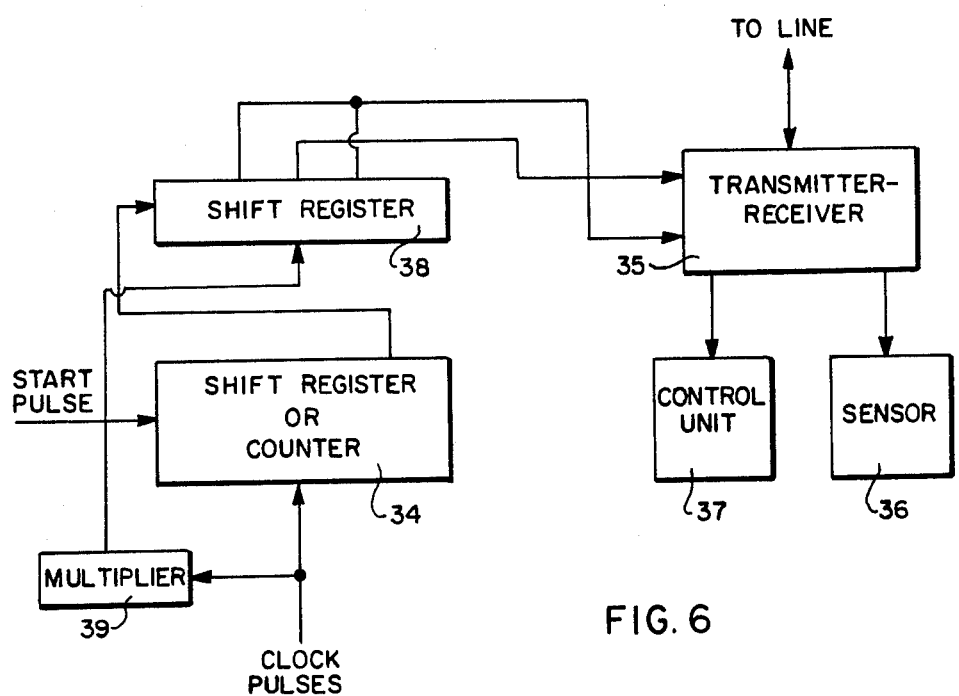
FIG. 6 is a schematic block diagram of a variation of the out-station of FIG. 5.

Alternatively, a second shift register responsive to the output of the shift register 34 may be provided to control the transmitter-receiver 35 as illustrated in FIG. 6. In accordance with this modification, a shift register 38 having twelve stages, for example, corresponding to the twelve bits in each pulse group time slot receives the output from the shift register 34 designating the beginning of the time slot for that particular out-station. The shift register 38 is driven by clock pulses received via the multiplier 39, permitting the input pulse to the shift register to be shifted through the 12 stages thereof during the course of one time slot of the shift register 34. The outputs of the first four stages and the last four stages of shift register 38 are then connected to enable the receiver portion of the transmitter receiver 35 while stages 5 through 8 of shift register 38 provide the control necessary to enable the transmitter portion of the transmitter receiver 35.

The shift register 34 may also be replaced by a binary counter and decoder combination. In this way, the binary counters in each of the out-stations are simultaneously reset by the start pulse which is received from the line and is driven by the clock pulses. Each out-station is assigned to a particular count which is detected by the decoder portion of the counter and serves to enable the transmitter-receiver in the manner already described.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A method for the two-way transmission of data between a plurality of out-stations connected in common to a three phase power supply network and at least one control unit, comprising the steps of
    modulating the data to be transmitted at a frequency substantially different from the power supply frequency,
    applying the modulated data to said three phase power supply network between one phase conductor and neutral,
    detecting modulated data carried by said power supply network, and
    demodulating the detected data carried by said power supply system.

2. A method as defined in claim 1 wherein said step of applying modulated data to said three phase power supply network includes the step of time division multiplexing of the modulated data.

3. A method as defined in claim 2 wherein said step of modulating the data comprises pulse code modulation.

4. A method as defined in claim 2, wherein said time division multiplexing is synchronized to the frequency of said power supply network.

5. A method as defined in claim 4 wherein clock pulses are generated to control said time division multiplexing at each out-station, the frequency of said clock pulses being a multiple of the frequency of said power supply network.

6. A method as defined in claim 5 wherein said power supply network is a three-phase network and the said multiple has the number three as a factor.

7. A method for the two-way transmission of data between a plurality of out-stations connected in common to a power supply network and at least one control unit, comprising the steps of
    pulse code modulating the data to be transmitted at a frequency substantially different from the power supply frequency at each out-station,
    applying a start pulse to said power supply network from said control unit,
    generating clock pulses at each out-station synchronized to the frequency of said power supply network,
    counting clock pulses in each out-station beginning at the time of detection of a start pulse carried by said power supply network, and
    applying modulated data from each out-station for a preselected time interval to said power supply network in coincidence with a respectively different count of said clock pulses.

8. A method as defined in claim 7 wherein at least one out-station modulates the data to be transmitted at a frequency different from at least one other out-station.

9. A method as defined in claim 7 wherein each out-station is enabled to transmit data for the duration of one clock pulse.

10. A method as defined in claim 7 wherein each out-station is enabled to transmit data for the duration of a plurality of clock pulses.

11. A method as defined in claim 7 wherein said data is modulated at a frequency in the range of 50 to 200 KHz.

12. A method as defined in claim 7 wherein the frequency of said clock pulses is a multiple of the frequency of said power supply.

13. A method as defined in claim 12 wherein said power supply network is a three-phase network and the said multiple has the number three as a factor.

14. An apparatus for the two-way transmission of data between a plurality of out-stations connected in common to a power supply network and at least one control unit also connected to said network and including means for applying start pulses to said power supply network at periodic intervals, comprising
    modulating means for effecting high frequency modulation of the data to be transmitted, means for coupling the modulated data to the power supply network, means for detecting modulated high frequency signals carried by said power supply network, and means for demodulating said detected high frequency signals;
    each out-station including means synchronized to the frequency of said power supply network for generating clock pulses, means responsive to detection of a start pulse carried by said power supply network for counting said clock pulses, and means responsive to detection of an assigned count of said clock pulses for enabling said means for coupling the modulated data to said power supply network.

15. An apparatus as defined in claim 14 wherein said control unit further includes a transmitter-receiver connected to said power supply network for transmitting modulated data to and receiving modulated data from said network.

16. An apparatus as defined in claim 15 wherein said transmitter-receiver is coupled capacitively to said power supply network.

17. An apparatus as defined in claim 15 wherein said transmitter-receiver is coupled inductively to said power supply network.

18. An apparatus for the two-way transmission of data between a plurality of out-stations connected in common to a power supply network and at least one control unit also connected to said network, comprising
    modulating means for pulse code modulating the data to be transmitted at a frequency substantially different from the power supply frequency at each out-station and at said control unit,
    start control means at said control unit for applying a start pulse to said power supply network,
    generator means at each out-station for generating clock pulses synchronized to the frequency of said power supply network,
    detection means at each out-station for detecting generation of a number of clock pulses by said generator means subsequent to receipt of a start pulse from said power supply network, said number of clock pulses being different for each out-station, and
    means responsive to said detection means for applying modulated data from said modulating means to said power supply network.

19. An apparatus as defined in claim 18 wherein said control unit includes a transmitter-receiver for transmitting modulated data to and receiving modulated data from said power supply network.

20. An apparatus as defined in claim 19 wherein said power supply network is a three-phase network, said out-stations and said control unit being connected between one phase conductor and neutral of said network.

21. An apparatus as defined in claim 20 wherein said generator means includes means for multiplying the frequency of said clock pulses by a number having the factor three.

22. An apparatus as defined in claim 19 wherein said detection means includes a shift register driven by said clock pulses and a start pulse detector for applying a detected start pulse to said shift register, the output of a selected stage of said shift register enabling said means for applying modulated data to said power supply system.

23. An apparatus as defined in claim 19 wherein said detection means includes a counter for counting said clock pulses, and a start pulse detector connected to said power supply network for resetting said counter upon detection of a start pulse, said means for applying modulated data to said power supply system being enabled by a particular count of said counter.

* * * * *